UNITED STATES PATENT OFFICE.

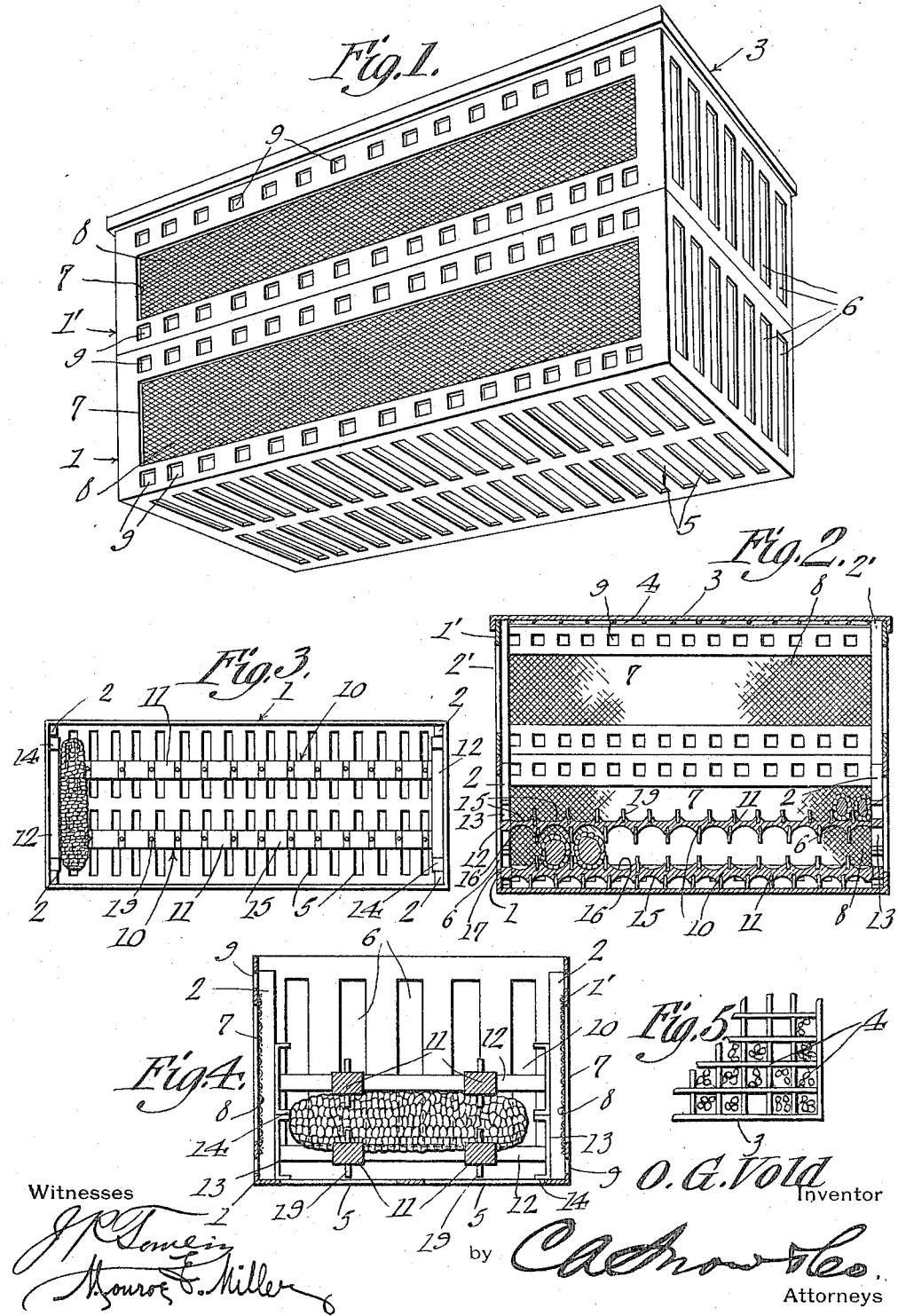

OLE G. VOLD, OF DAWSON, MINNESOTA.

SEED-CORN CRATE AND DRIER.

1,166,283.     Specification of Letters Patent.     Patented Dec. 28, 1915.

Application filed January 14, 1915. Serial No. 2,213.

*To all whom it may concern:*

Be it known that I, OLE G. VOLD, a citizen of the United States, residing at Dawson, in the county of Lac qui Parle and State of Minnesota, have invented a new and useful Seed-Corn Crate and Drier, of which the following is a specification.

The present invention appertains to a seed corn crate and drier, and is particularly an improvement over the seed corn crate and drier disclosed in my Patent No. 1,108,412, issued August 25, 1914.

It is the object of this invention to provide a novel holder and carrier for ears of seed corn, whereby the same may be properly racked for storage or transportation, and whereby the corn may be properly ventilated for the purpose of curing and preserving the kernels.

As a more specific object, the invention aims to provide a crate having a unique means therein for supporting the ears of corn in rows or series, provision being made whereby various sizes of ears may be accommodated, with the ears spaced apart.

Another object of the invention is the provision of grading means carried by the device, whereby the kernels may be graded to select the desirable kernels readily.

A still further object of the invention is the provision in a device of the character described, of means for facilitating the testing of the kernels.

It is also within the scope of the invention, to provide a seed corn crate and drier improved generally in its construction and details, to enhance the utility thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in its preferred embodiment in the accompanying drawing, wherein:—

Figure 1 is a perspective view of the improved crate. Fig. 2 is a longitudinal vertical section thereof. Fig. 3 is a plan view of the device. Fig. 4 is an enlarged cross sectional view thereof. Fig. 5 is a fragmental detail of the cover or lid, illustrating the tester.

In carrying out the invention there is provided a receptacle or container 1, forming the body of the crate, and preferably constructed of sheet metal. One or more bottomless extensions or supplemental crate sections 1' may be employed in connection with the receptacle or body 1, to increase the height and capacity thereof. As illustrated, one of the extensions or sections 1' is seated upon the receptacle or container 1, although more than one of the extensions may be employed, or the extensions need not be utilized if a low crate is desirable. Corner posts 2 are secured within the corners of the receptacle or container 1 and similar corner posts 2' are secured within the corners of the extension 1' and the ends of the corner posts 2' may be extended to fit within the corners of the receptacle 1 for holding the extension 1' in place upon the receptacle or body 1, although any suitable means may be provided for this purpose.

A cover or lid 3 is provided to fit over the receptacle 1, or its extension 1', and crossed wires or other elements 4 are secured to the cover 3 adjacent the bottom or lower surface thereof, thereby to provide cells or pockets for receiving kernels of corn for testing purposes.

The bottom of the receptacle 1 is provided with transverse slots 5, to permit of the passage of air through the bottom of the crate, especially when the crates are stacked or set one upon the other, and the slots 5 also provide means for grading the kernels, as will hereinafter appear more fully. The ends of the receptacle 1 and its extension 1' are provided with upright ventilating slots 6 and the sides of the receptacle and extension are provided with rectangular or elongated openings 7. Reticulated or meshed wire panels 8 are secured to the sides of the receptacle and extend across the openings 7 and permit of ventilation through the sides of the crate, and also prevent rodents from entering the crate through the openings 7. The sides of the receptacle and extension are also preferably provided with openings or apertures 9 above and below the openings 7 and panels 8, for providing additional ventilating means. The openings or slots 5, 6 and 9 are sufficiently narrow to exclude rats, mice and other rodents from the interior of the crate.

A plurality of racks 10 are adapted to be set one upon the other within the receptacle 1 and extension 1', and each embodies a pair of longitudinal bars or rails 11, and cross bars 12 secured to the ends of the bars or rails 11. Upright strips 13 are secured to the ends of the cross bars 12, and project above and below the same to provide supporting legs, the ends of which are provided with angularly extending portions 14, forming feet and handles. The upper and lower surfaces of the rails 11 are sinuous and corrugated transversely, to provide transverse grooves or recesses 15 and 16 in which the ears of corn are seatable. Each bar or rail 11 is provided with a series of relatively narrow grooves 15 upon one side, and with a series of relatively wide grooves 16 upon its other side, the grooves 15 and 16 of the bars or rails 11 of each pair being in transverse alinement and coöperating to receive and hold the ears of corn, so that when the rack is held in one position, it will accommodate small ears of corn, and when the rack is inverted, it will accommodate relatively large ears of corn. Removable pins or pegs 19 are engaged into the rails or bars 11 between the grooves or recesses 15 and 16, to assist in holding and separating the ears of corn.

In practice, to fill the crate, the first or lowermost rack 10 is placed within the receptacle 1, with the proper grooves of the rack uppermost, to receive the ears of corn, and when the first rack is filled, the next succeeding rack is placed within the receptacle upon the first rack. Thus, as the racks are filled and set one upon the other, the crate will become filled with the ears of corn which are arranged transversely between the sides of the case, and which are spaced suitable distances apart to permit of the ventilation of the corn, for the intended purposes. The end or cross bars 12 of the racks fit between the corner posts 2 and 2' for holding the racks snugly in place, and the supporting legs or members 13 serve to space the racks apart and to support one rack upon the other. The portions 14 of the legs 13 serve as feet and handles, the lower portions 14 providing feet to rest upon the bottom of the receptacle or upon the next lower rack, and the upper portions 14 serving as handles to enable the racks to be readily inserted into and removed from the crate.

With the present device, a large number of ears of corn may be stored within the crate, and the air may circulate readily through the crate and between the ears. The ears of corn will also be held properly in place and cannot become displaced or mixed. The corn may be readily examined, by removing the cover 3, and lifting the racks out of the receptacle, one at a time, and the cover 3 also serves as a tester. Thus, a few kernels may be taken from each ear of corn contained in the crate, and may be deposited in one of the cells or pockets provided by the crossed wires or members 4 of the cover, and the said cells may be numbered or otherwise designated, in the manner of an ordinary tester, in order that the attendant may know from what ears of corn the kernels were taken. Another desirable feature of the invention, resides in the fact that the slots 5 in the bottom of the receptacle 1 may be utilized for grading the kernels. To this end, a pair of the receptacles 1 is employed, the slots 5 of one receptacle being sufficiently narrow to retain the desirable kernels within the receptacle, while the slots of the other receptacle are sufficiently wide to permit the desirable kernels to pass therethrough. The kernels are first placed within one receptacle, which serves as a sieve, to permit the small undesirable kernels to fall through the slots 5, and the kernels retained within the first receptacle are then dumped into the second receptacle having the largest slots 5 which will act as a sieve, to enable the desirable kernels to fall through the slots, while the large undesirable particles are retained within the receptacle. In this manner, the desired size of kernels may be selected from the undesirable kernels.

Having thus described the invention, what is claimed is:—

1. In a device of the character described, a receptacle, and a plurality of racks disposed one upon the other within the receptacle, and each embodying longitudinal bars and cross bars secured to the ends thereof, the longitudinal bars having grooves for holding ears of corn, and the cross bars being arranged to fit snugly within the receptacle and having means seatable upon each other for supporting the racks.

2. In a device of the character described, a receptacle, and a plurality of racks disposed one upon the other within the receptacle, and each comprising longitudinal bars and cross bars secured to the ends thereof, the longitudinal bars having upper and lower transverse grooves of different widths and pegs between the grooves, the cross bars being arranged to fit snugly within the receptacle, and having supporting members projecting upwardly and downwardly therefrom to seat one upon the other, the racks being invertible.

In testimony that I claim the foregoing as my own, I have hereto affixed my signature in the presence of two witnesses.

OLE G. VOLD.

Witnesses:
THEODORE CHRISTIANSON,
CLARENCE L. LARSON.

Copies of this patent may be obtained for five cents each, by addressing the "Commissioner of Patents, Washington, D. C."